(12) United States Patent
Ramos

(10) Patent No.: US 7,430,903 B2
(45) Date of Patent: Oct. 7, 2008

(54) FLUID FLOW MEASUREMENT USING OPTICAL FIBRES

(75) Inventor: Rogerio Ramos, Eastleigh (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 289 days.

(21) Appl. No.: 10/554,117

(22) PCT Filed: Mar. 22, 2004

(86) PCT No.: PCT/GB2004/001223

§ 371 (c)(1),
(2), (4) Date: Oct. 21, 2005

(87) PCT Pub. No.: WO2004/094961

PCT Pub. Date: Nov. 4, 2004

(65) Prior Publication Data

US 2006/0214098 A1    Sep. 28, 2006

(30) Foreign Application Priority Data

Apr. 23, 2003   (GB) ................ 0309233.5

(51) Int. Cl.
*G01F 1/68*   (2006.01)

(52) U.S. Cl. .............. 73/204.11; 73/152.33; 73/204.17

(58) Field of Classification Search .............. 73/152.33, 73/204.17, 204.23
See application file for complete search history.

(56) References Cited

U.S. PATENT DOCUMENTS

| | | | | |
|---|---|---|---|---|
| 4,986,671 A | * | 1/1991 | Sun et al. | 374/131 |
| 5,115,127 A | * | 5/1992 | Bobb et al. | 250/227.19 |
| 6,847,034 B2 | * | 1/2005 | Shah et al. | 250/269.1 |

* cited by examiner

*Primary Examiner*—Hezron E. Williams
*Assistant Examiner*—Paul M West
(74) *Attorney, Agent, or Firm*—Trop, Pruner & Hu, P.C.; Daryl R. Wright; Bryan P. Galloway

(57) ABSTRACT

A method of monitoring fluid flow uses an optical fiber having a heatable coating. The fiber is disposed within flowing fluid, and the heatable coating heated so that heat is transferred from the coating to the fluid. Optical measurements of the temperature of the heatable coating are made, where the temperature of the heatable coating depends on the flow velocity of the flowing fluid, and the temperature measurement is used to derive information about the flow. The coating may be an electrically resistive layer on the outer surface of the fiber, that is heated by passing electric current through it. This allows distributed flow measurements to be made. Alternatively, discrete measurements can be made if the coating is provided as a thin film layer on an end facet of the fiber. The coating is heated by directing light at a wavelength absorbed by the thin film material along the fiber.

54 Claims, 9 Drawing Sheets

FLUID FLOW MEASUREMENT USING OPTICAL FIBRES

BACKGROUND OF THE INVENTION

The present invention relates to the measurement and monitoring of fluid flow, using optical fibres.

The hot wire anemometer has been long known as a device for measuring fluid flow [1]. The device comprises a thin wire typically a few millimeters long which is placed orthogonally to the direction of the flow to be measured. A voltage is applied across the wire, and the resulting current flow through the wire, which is inversely proportional to the resistance according to Ohm's law, heats the wire. This heat is transferred to the fluid at a rate which is dependent on the flow velocity of the fluid, until a final equilibrium temperature of the wire is reached. The wire resistance depends on its temperature, so the current can be related to the flow velocity. Measurement of the current can therefore be used to calculate the flow rate.

The principle of the hot wire anemometer depends on the cooling effect of a fluid flowing past a heated object, so that a measurement of the temperature of the object, or a parameter related thereto, gives an indication of the rate of flow.

It is frequently useful to obtain measurements of the rate of flow of oil, gas and water within the well bore of an oil well. The hot wire anemometer is disadvantageous in this situation. The device provides a single localised measurement, where well bores can be hundreds or thousands of meters deep, with the fluid flow at all or many depths being of interest. Further, it is preferred not to use electric current in oil industry sensors because of the risk of explosion. Also, the thin wire is fragile, and hence unsuited to the rigours of the downhole environment.

In contrast, optical fibres are known to be well-suited for downhole sensing applications. They are robust enough to withstand the high temperatures and pressures, and operate without electric current. Distributed measurements can be obtained representing the whole length of a fibre, thus providing a more complete picture than individual discrete measurements. In particular, optical fibres have been shown to be of use for downhole temperature sensing. One technique detects changes in backscattered light from within the fibre caused by changes in temperature.

Consequently, a number of flow measurement methods have been proposed which exploit the proven technology of optical fibre temperature sensing. A first technique [2] uses the cooling effect of flowing fluid exploited in the hot wire anemometer. A heater cable is disposed within a well bore, and is heated by current being passed through it. Optical fibres are arranged adjacent to the cable, and operate as temperature sensors to measure the temperature of the heated cable as it is cooled by flowing oil. This gives a temperature profile over the extent of the cable, from which the fluid flow is determined. Thus a distributed measurement is possible, but the cable-fibre structure is bulky and awkward to fabricate, in part because of the need for adequate electrical insulation. Also, the accuracy of the measurements relies on providing good thermal contact between the cable and the fibres.

A further technique relies on the transfer of heat from a heat source to the fluid [3]. A thermal sensor, which may have the form of an optical fibre, is arranged downhole adjacent to a thermal source. The source is heated, and the sensor is used to measure changes in the fluid caused by the transfer of heat to the fluid. The flow rate is calculated from the amount of heat transferred. This two-part arrangement of sensor and source is complex to deploy, operate and maintain, and the results require the distance between source and sensor to be considered.

A similar arrangement of equipment is used in a more recent approach which, however, is less mathematically complex [4]. A fibre temperature sensor is deployed in the well bore together with a heat exchanger arranged upstream with respect to the direction of oil flow. A quantity of oil is heated or cooled by the heat exchanger, and the temperature sensor detects the presence of this oil at two or more positions as it flows up the bore. From this, the flow velocity is calculated. This is a simple approach, but requires the heat exchanger to be arranged in the passage of the oil, which then can disturb the flow.

An alternative method relies in the long term only on a fibre temperature sensor, with no other downhole equipment being required [5]. However, a first step in the method uses dedicated conventional flow measurement means such as spinner or Venturi methods to obtain localised flow measurements, at the same time as measuring the temperature profile of the well using the fibre. This provides a calibration relating temperature to flow from which a model is derived. Subsequently, the model is used to calculate flow from future temperature measurements. The method is mathematically intensive, because many parameters describing the well are required to obtain an accurate model.

Hence there is a requirement for an improved method of monitoring flow, using simple apparatus.

SUMMARY OF THE INVENTION

Accordingly, a first aspect of the present invention is directed to a method of monitoring fluid flow comprising: providing an optical fibre having a heatable coating; disposing the optical fibre so that the heatable coating is in thermal contact with flowing fluid; heating the heatable coating so that heat is transferred from the coating to the fluid; launching light into the optical fibre; detecting light from the optical fibre; processing the detected light to obtain information indicative of the temperature of the heatable coating, where the temperature of the heatable coating depends on the flow; and using the information indicative of the temperature of the heatable coating to derive information about the flow.

Provision of a heatable coating on an optical fibre allows it to be used as a particularly simple fluid flow monitor, by exploiting the principles of the hot wire anemometer, in which the temperature of a heated element is used to determine fluid flow velocity by relying on cooling of the heated element by the flowing fluid. The fibre itself is used as a temperature sensor to measure the temperature of the coating. The resulting device is compact, particularly when compared to known optical fibre-based systems; this is a valuable feature in a flow measuring device because a bulky device tends to disrupt the flow being measured. The fibre is also robust and well able to withstand the environmental rigours of places such as oil wells, in which flow measurements of oil, gas and water are of great importance. No complex calculations or measurement of external parameters are required. Instead, the coating temperature is measured using optical signals transmitted along the fibre, and monitored for changes, which indicate that an alteration in flow (desirable or undesirable) has occurred.

The method is generally applicable to monitoring and measuring various fluid and flow characteristics. For example, the temperature of the heatable coating may depend on the flow velocity or the rate of flow, in which case the information indicative of the temperature of the heatable coating may be used to derive information about the flow velocity or the rate of flow. Alternatively, the temperature of the heatable coating may depend on the type of the fluid, so that the information indicative of the temperature of the heatable coating may be used to derive information about the type of the fluid.

In one embodiment, the heatable coating is provided as a layer around the outer surface of the optical fibre extending axially along the optical fibre. This allows heat to be dissipated from the coating to the fluid along the length of the fibre, so that a distributed measurement of flow can be made. This is useful for monitoring flow over distance, or for determining the position of a particular anomaly somewhere in a system.

The heatable coating may comprise electrically resistive material, and the heatable coating is heated by passing electric current through the coating. Fibres coated with electrically resistive material are commercially available, or can be readily fabricated. Using electric current to heat the coating is a straightforward and controllable way of providing uniform heating of the coating when it is arranged over the length of the fibre, so that heat flux from the coating to the fluid only depends on the fluid flow. This ensures that a distributed measurement has the same accuracy at all points along its length. For some applications, the optical fibre may be further provided with an electrically insulating coating covering the heatable coating.

Alternatively, the heatable coating may comprise optically absorbing material, and the heatable coating is heated by exposing the heatable coating to light at a wavelength that is absorbed by the optically absorbing material. The heatable coating may be exposed by injecting light at a wavelength that is absorbed by the optically absorbing material into cladding of the optical fibre. This arrangement removes the need for electrical current, so it provides a safer method, particularly as regards the risk of explosion.

The method may be performed such that the launching light, detecting light and processing the detected light comprises operating the optical fibre as a distributed temperature sensor. This is a known and reliable method of obtaining temperature measurements from an optical fibre that can be usefully combined with a heatable coated fibre to implement the present invention in a straightforward and simple manner, so as to provide distributed flow monitoring.

The method may then comprise using the information indicative of the temperature of the heatable coating to derive information about the composition of the fluid. If some information about the expected flow pattern is known, differences or changes can indicate a change in fluid composition, since different fluids may arrive in the flow volume with different temperatures, and are also likely to have different thermal properties so that the rate of heat transfer from the heatable coating to the fluid will be different. For example, the information about the composition of the fluid may include at least one of the oil content, the gas content and the water content of fluid flowing in an oil well.

Advantageously, in performing the method, the using the information indicative of the temperature of the heatable coating to derive information about the flow comprises identifying changes in temperature along the length of the fibre, such a change indicating the location of a change in the flow of the fluid. This is a particularly simple way of locating any change in flow of the fluid.

The identifying changes in temperature may comprise locating positions of inflow or outflow of fluid in the vicinity of the optical fibre. The location of leaks into or out of a pipe can be remotely detected in this way. This can reduce the need for any extensive excavations or other investigations, thus saving time and money, and reducing damage.

The method of monitoring fluid flow may therefore comprise a method of locating leaks, in which: the optical fibre is disposed within a leaking pipe; and the method further comprises, before heating the heatable coating: allowing fluid to flow into the pipe; and any change identified is an increase in temperature with respect to the direction of fluid flow, caused by a decreased flow of the fluid after the position of a leak.

Alternatively, the identifying changes in temperature may comprise locating positions of any constrictions in flow. A constriction, such as a blockage, or damage to the pipe, will cause the flow velocity to increase, so that more heat is transferred and the heatable coating is cooled more. Thus a change in the temperature profile will be observed at the position of the constriction, allowing a known constriction to be located or a new or developing constriction to be identified.

According to a second embodiment, the heatable coating is provided on a distal end facet of the optical fibre. This arrangement allows the coated fibre to be used to obtain localised flow measurements, so that flow can be monitored at a given position within a system without any need for positional information to be extracted from a distributed measurement. This approach is therefore computationally less complex than the first embodiment, but provides less information from a single measurement.

The heatable coating may comprise optically absorbing material, and the heatable coating is heated by exposing the heatable coating to light at a wavelength that is absorbed by the optically absorbing material. Using optical power to heat the heatable coating makes for a particularly safe sensor, as there is no requirement for electrical current in the vicinity of the measurement location. Any need for electrical insulation is also thereby avoided, which can potentially lead to a more sensitive device because the coating and the fluid can be in direct thermal contact.

Preferably, the heatable coating is exposed by injecting light at a wavelength that is absorbed by the optically absorbing material into a proximal end of the optical fibre. Further, launching light into the optical fibre preferably comprises launching the light into the proximal end of the optical fibre, the light having a wavelength such that it is reflected from the heatable coating. A further advantage of an optically heated coating is hence that if light having a wavelength which is only partially absorbed by the coating is used to heat the coating, the same light can be used to measure the temperature of the coating, making for a simplified apparatus and method.

The processing the detected light may comprise measuring the amount of detected light reflected from the heatable coating and using this information to obtain information relating to the temperature of the heatable coating. The heatable coating may be selected to have one or more properties that vary with temperature, such as refractive index or absorption, that will affect the reflected light. For example the processing the detected light may comprise measuring the amount of detected light reflected from the heatable coating and using this to obtain information relating to the optical thickness of the heatable coating, where the optical thickness of the heatable coating depends on its temperature. Thus, monitoring of the flow can be performed merely by measuring the amount of reflected light; any increase or decrease indicates a change in flow.

In one embodiment, the heatable coating is provided as a single layer. This is an advantageously simple arrangement, that is straightforward to fabricate. In an alternative arrangement, the heatable coating is provided as two layers, one layer being optically absorptive and one layer being optically dependent on temperature. This is a more complicated configuration, that offers the alternative advantage that the materials of the two layers can be individually selected to provide optimum heating and temperature measuring.

Advantageously, the optical fibre is disposed within a well bore. Optical fibre sensors are well-suited to the downhole environment of a well bore, particularly oil well bores, and, being compact, do not adversely affect the flow being measured. Also, there are established techniques for deploying fibres into well bores that can be exploited in conjunction with the present invention to provide a simple yet useful oil industry flow monitor.

A second aspect of the present invention is directed to apparatus for monitoring fluid flow, comprising: an optical fibre having a heatable coating for disposing in thermal contact with flowing fluid; a power source operable to heat the heatable coating so that heat is transferred from the coating to the fluid; an optical source operable to generate light and launch the light into the optical fibre; a photodetector operable to detect light from the optical fibre; and a processor operable to process the detected light to obtain information indicative of the temperature of the heatable coating, where the temperature of the heatable coating depends on the flow. The processor may be further operable to derive information about the flow from the information indicative of the temperature of the heatable coating.

The temperature of the heatable coating may depend on the rate of flow or flow velocity, so that the processor may be operable to derive information about the rate of flow or flow velocity from the information indicative of the temperature of the heatable coating. Alternatively or additionally, the temperature of the heatable coating may depend on the type of fluid, so that the processor may be operable to derive information about the type of fluid from the information indicative of the temperature of the heatable coating.

The heatable coating may be provided as a layer around the outer surface of the optical fibre extending axially along the optical fibre. The heatable coating may comprise electrically resistive material, and the power source may be an electrical power source operable to heat the heatable coating by passing electric current through the coating. The optical fibre may be further provided with an electrically insulating coating covering the heatable coating.

Alternatively, the heatable coating may comprise optically absorbing material, and the power source may be an optical power source operable to heat the heatable coating by exposing the heatable coating to light at a wavelength that is absorbed by the optically absorbing material. The optical power source may be operable to inject light at this wavelength into cladding of the optical fibre.

Advantageously, the optical source, the photodetector and the processor are operable to enable operation of the optical fibre as a distributed temperature sensor. The processor may be operable to derive information about the composition of the fluid from the information indicative of the temperature of the heatable coating. The information about the composition of the fluid may include at least one of the oil content, the gas content and the water content of fluid flowing in an oil well. The processor may be further operable to use the information indicative of the temperature of the heatable coating to derive information about the flow by identifying changes in temperature along the length of the fibre, such a change indicating the location of a change in the flow of the fluid. The identifying changes in temperatures may comprise locating positions of inflow or outflow of fluid in the vicinity of the optical fibre.

The apparatus may be operable to locate leaks, so that the flowing fluid flows within a leaking pipe; and the apparatus further comprises: a pump operable to pump fluid into the pipe; and the processor is further operable to identify any change increase in temperature with respect to the direction of fluid flow, caused by a decreased flow of the fluid after the position of a leak.

In an alternative, the identifying changes in temperature may comprise locating positions of any constrictions in flow.

Alternatively, the heatable coating may be provided on an end facet at a distal end of the optical fibre. The heatable coating may comprise optically absorbing material, and the power source may be an optical power source operable to heat the heatable coating by exposing the heatable coating to light at a wavelength that is absorbed by the optically absorbing material. The optical power source may also be operable to inject light at a wavelength that is absorbed by the optically absorbing material into a proximal end of the optical fibre. Further, the optical source may be operable to launch light having a wavelength such that it is reflected from the heatable coating into a proximal end of the optical fibre.

The processor may be operable to measure the amount of detected light reflected from the heatable coating and use this to obtain information relating to the temperature of the heatable coating. The processor may be operable to measure the amount of detected light reflected from the heatable coating and use this to obtain information relating to the optical thickness of the heatable coating, where the optical thickness of the heatable coating depends on its temperature.

In one configuration, the heatable coating is provided as a single layer. Alternatively, the heatable coating may be provided as two layers, one layer being optically absorptive and one layer being optically dependent on temperature.

Advantageously, the optical fibre is deployed within a well bore.

A third aspect of the present invention is directed to a method of monitoring fluid flow in an oil well, comprising: providing an optical fibre having a heatable coating; deploying the optical fibre downhole in an oil well such that the heatable coating is in thermal contact with flowing fluid; heating the heatable coating so that heat is transferred from the coating to the fluid; launching light into the optical fibre; detecting light from the optical fibre; processing the detected light to obtain information indicative of the temperature of the heatable coating, where the temperature of the heatable coating depends on the flow; and using the information indicative of the temperature of the heatable coating to derive information about the flow.

The heatable coating may be provided as a layer around the outer surface of the optical fibre extending axially along the optical fibre. The launching light, detecting light and processing the detected light may then be performed so as to obtain the information indicative of the temperature of the heatable coating in the form of a distributed temperature profile over the length of the optical fibre.

In one embodiment, the using the information indicative of the temperature of the heatable coating to derive information about the flow comprises identifying changes in temperature with depth within the well bore, such a change indicating the location of a change in the flow of the fluid. The identifying changes in temperature may usefully comprise locating any constriction in the flow that causes an increase in the flow of the fluid, and the locating any constriction in the flow may comprise locating any deposit of scale within the well bore.

Furthermore, the method may further comprise using the information indicative of the temperature of the heatable coating to derive information about the composition of the fluid. Advantageously, the information about the composition of the fluid includes at least one of the oil content, the gas content and the water content of the fluid.

A fourth aspect of the present invention is directed to a method of detecting scale within a well bore, comprising: providing an optical fibre having a heatable coating; deploying the optical fibre downhole within a well bore so that the heatable coating is in thermal contact with fluid flowing within the well bore; heating the heatable coating so that heat is transferred from the coating to the fluid; launching light into the optical fibre; detecting light from the optical fibre; processing the detected light to obtain information indicative of any variation in temperature of the heatable coating with depth within the well bore, where the temperature of the heatable coating depends on the flow of the fluid; monitoring the temperature information for any changes in temperature of the heatable coating with depth within the well bore; and identifying any change in temperature with a change in fluid flow within the well bore caused by scale deposition at that depth.

BRIEF DESCRIPTION OF THE DRAWINGS

For a better understanding of the invention and to show how the same may be carried into effect reference is now made by way of example to the accompanying drawings in which.

DETAILED DESCRIPTION

First Embodiment

A first embodiment of the present invention uses a coated optical fibre as an anemometer to achieve distributed fluid flow monitoring. That is, an indication of flow along the whole length of the fibre can be obtained.

The invention relies on the cooling effect produced by fluid flowing over a surface that is hotter than the fluid. Heat is transferred from the surface to the fluid at a rate that depends on the flow velocity of the fluid; a faster flow carries more heat away from the surface. Thus, the surface is cooled. A measurement of the resulting surface temperature can therefore provide an indication of the flow velocity, with low temperatures corresponding to high flow velocity.

Figure 1:
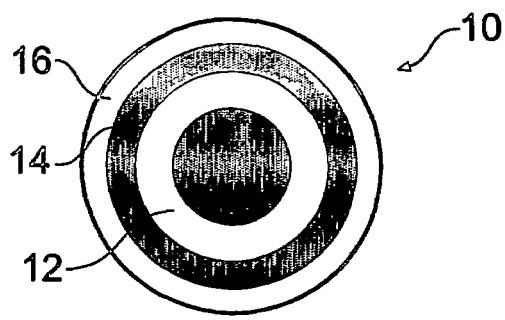
FIG. 1 shows a transverse cross-sectional view of an optical fibre according to a first embodiment of the present invention.

FIG. 1 shows a transverse cross-section through an optical fibre according to the first embodiment. The optical fibre 10 is a conventional fibre fabricated from silica, with a core surrounded by a cladding region 12 (the details of which are not shown). The fibre 10 has a heatable coating 14 arranged as a first layer surrounding the fibre 10. The heatable coating 14 extends substantially along the axial length of the fibre 10 over as great a distance as is of interest for flow monitoring. Finally, an outer layer or coating 16 of electrically insulating material is provided over the top of the heatable coating 14.

According to the first embodiment, the heatable coating is heated electrically. Therefore, the heatable coating comprises an electrically resistive material that heats up when electric current is passed through it. Any material that behaves in this way and which can be provided as a layer on an optical fibre can be used. Metal may be used; techniques for providing optical fibres with metallic coatings are known in art. Also, carbon hermetic is a suitable material. Fibre coated with carbon hermetic is commercially available, for example as product BF06287 from OFS in Avon, Conn., USA, in which the carbon hermetic is intended to prevent chemical attack to the silica. It is suitable for the present application, however, because its resistivity is normally between 1 and 2 MΩ/m, typically 1.3 MΩ/m. BF06287 further has an overcoat of polyamide, to protect the fibre from high temperatures, but which in this case provides electrical insulation. Alternatively, any electrically insulating material suitable for coating onto a fibre, or being otherwise being provided as an outer jacket or layer, can be used. For some applications, the electrically insulating layer may be deemed unnecessary, and omitted.

When an electric current is passed through the resistive heatable coating, heat is generated in the coating. The heat flux provided to the coating, $q_1$, is given by:

$$q_1 = P/(\pi d l)$$

where d is the outer diameter of the fibre, l is the fibre length, and P is the electrical power delivered to the heatable coating, given by $P=I^2 r l$, where I is the current and r is the resistivity of the coating.

The heat generated in the heatable coating is transmitted to the surrounding environment. If the fibre is immersed in flowing fluid, the heat will therefore transmit to the fluid. The heat flux from the coating to the fluid, $q_2$, is given by:

$$q_2 = Nu(k_{fl}/l)\Delta T$$

where $k_{fl}$ is the thermal conductivity of the fluid, $\Delta T$ is the temperature difference between the coating and the fluid, and Nu is the Nusselt number, approximated by:

$$Nu = 0.332 Re^{0.5} Pr^{1/3}$$

where the Reynolds number, $Re = vd\rho/\mu$ and the Prandlt number, $Pr = c\mu/k_{fl}$, in which $v$ is the fluid velocity, $\rho$ is the fluid density, $\mu$ is the fluid dynamic viscosity and $c$ is the specific heat of the fluid. As an example, for water the approximate parameters are $\rho=1000$ kg/m3, $\mu=0.001$ Ns/m2, $c=4000$ J/kgK, and $k_{fl}=0.61$ W/mK.

Equilibrium is reached when the heat fluxes balance, i.e. when $q_1 = q_2$. Using the above equations, it can be shown that at equilibrium, the temperature difference $\Delta T$ is given by $$\Delta T = P/Nuk_{fl}\pi d$$

Using the dependence of the Nusselt number on the fluid velocity it is therefore possible to see how the temperature difference will vary with fluid velocity.

Figure 2:
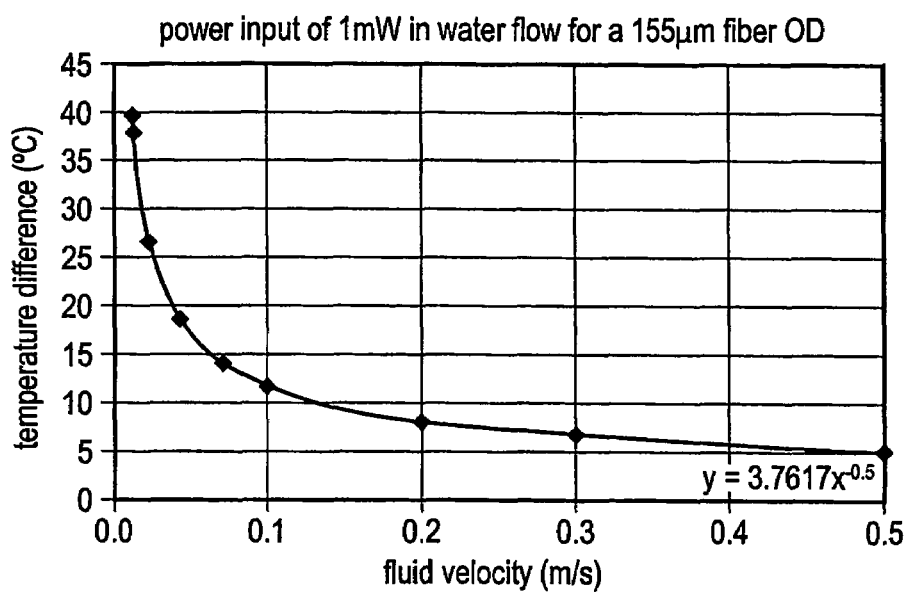
FIG. 2 shows a graph of the variation of temperature difference between a heated coating of the fibre of FIG. 1 and flowing fluid in which it is placed, with velocity of the fluid.

FIG. 2 shows a plot of this variation using water as an example fluid, when an electrical power of 1 mW is applied the heatable coating of an optical fibre with an outer diameter of 155 μm. Note that the temperature difference is higher for lower fluid velocities. This is as expected, because a higher fluid flow provides a larger volume of water to carry heat from the fibre, thus cooling the fibre and reducing the temperature difference.

Figure 3:
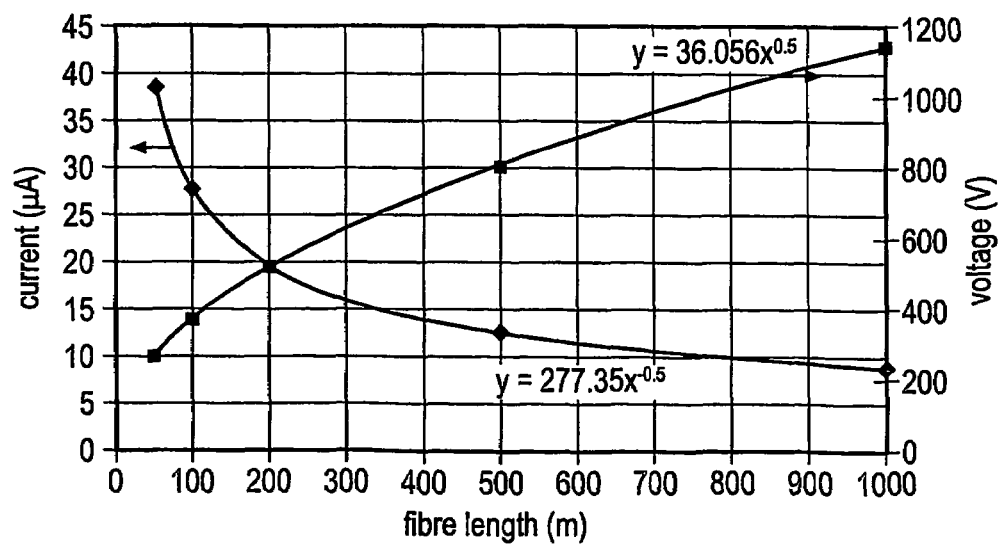
FIG. 3 shows a graph of the variation of electric current and voltage applied to a heatable coating of different lengths of the fibre of FIG. 1.

Continuing with this example, it is possible to calculate the current and voltage required to dissipate the 1 mW of electrical power in various lengths of fibre having a resistivity of 1.3 MΩ/m. FIG. 3 shows the results of this. Note that although the total voltage required can become quite high, the voltage per meter is low, as is the current.

The above analysis demonstrates how the fluid flow past the fibre is related to the temperature difference between the heatable coating and the fluid. Thus, if the temperature of the coating is measured and/or monitored, it is possible to derive information relating to the flow.

The use of optical fibres to measure temperature is well-established. One technique for obtaining a distributed measurement along the length of the fibre is known as distributed temperature sensing (DTS), and is used in this embodiment.

To perform DTS, a pulse of light is generated from a light source and launched into one end of an optical fibre. The light propagates along the fibre, interacting with the material of the fibre at all points along the fibre length. This interaction produces a small amount of scattered light from Raman scattering. The Raman scattered light is shifted in wavelength from the original pulse, and has an amplitude that varies with temperature of the fibre.

Figure 4:
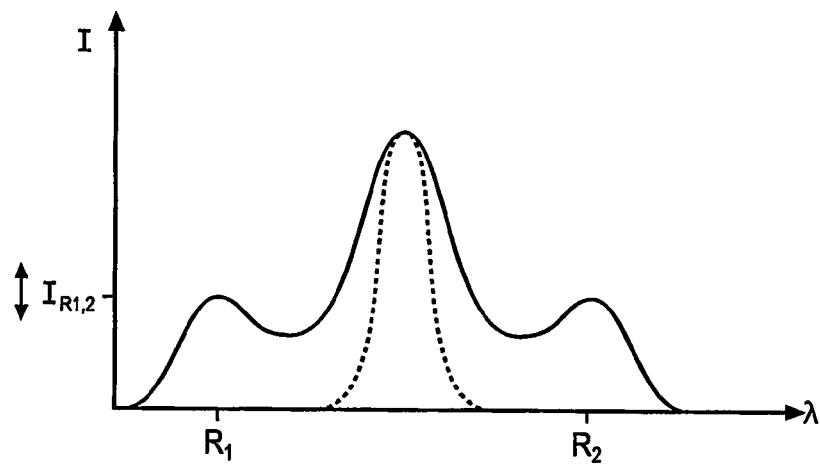
FIG. 4 shows a representative spectrum of light emitted from the fibre of FIG. 1 when used as a DTS system.

FIG. 4 shows an example spectrum of a pulse of light that has undergone Raman scattering, as a plot of wavelength $\lambda$ against intensity I. The dotted curve represents the original pulse launched into the fibre, and the solid curve represents the pulse after scattering. The pulse is greatly broadened about the original central wavelength, and has two side peaks R1 and R2 arising from the Raman scattering, one on each side of the central peak. These peaks have intensities $I_{R1}$ and $I_{R2}$ that vary with temperature, as indicated by the arrow in the Figure. The short wavelength peak R1 is commonly used for DTS.

Some of the Raman scattered light is back-scattered back along the fibre towards the source, and is detected as it is emitted from the fibre. The speed of light within the fibre is constant, so the amount of time between launch of the pulse and detection of the back-scattered light is proportional to the position along the fibre at which the scattering occurred. Thus, the output of the fibre over time represents a distributed measurement, or profile, over the entire length of the fibre, with time corresponding to distance and amplitude corresponding to temperature.

Figure 5:
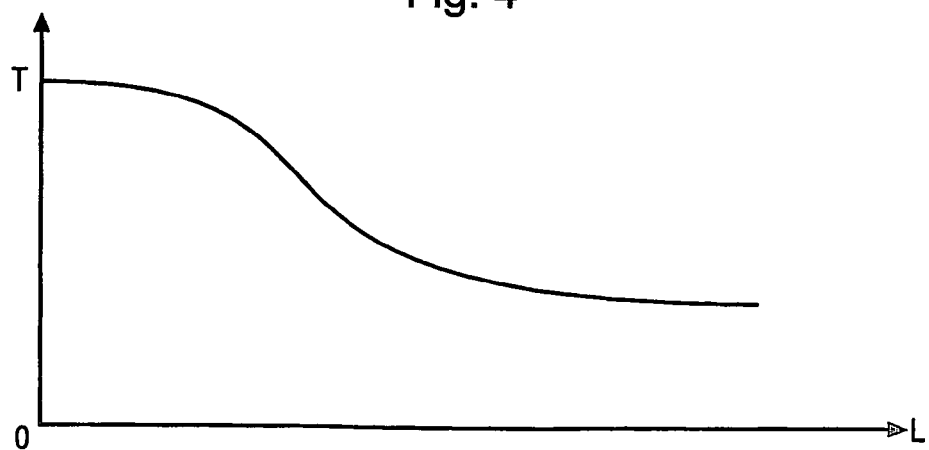
FIG. 5 shows a representative distributed temperature profile obtained from the fibre of FIG. 1 when used as a DTS system.

FIG. 5 is an example of such a distributed measurement, as a plot of temperature T against fibre length L. The proximal end of the fibre is hotter than the distal end of the fibre, with a smooth transition in the central portion of the fibre.

Alternative DTS set-ups rely on the detection of changes in other optical phenomena and characteristics, such as Brillouin scattering, attenuation arising from microbending and other loss-inducing factors, and interferometric arrangements. However, the example of Raman scattering will be retained in the remainder of this description.

For the purposes of the invention, it is assumed that the temperature of the fibre is the same as that of the heated heatable coating, or at least proportional thereto, so that a distributed temperature measurement of this type can give an indication of the fluid flow past the fibre.

Figure 6:
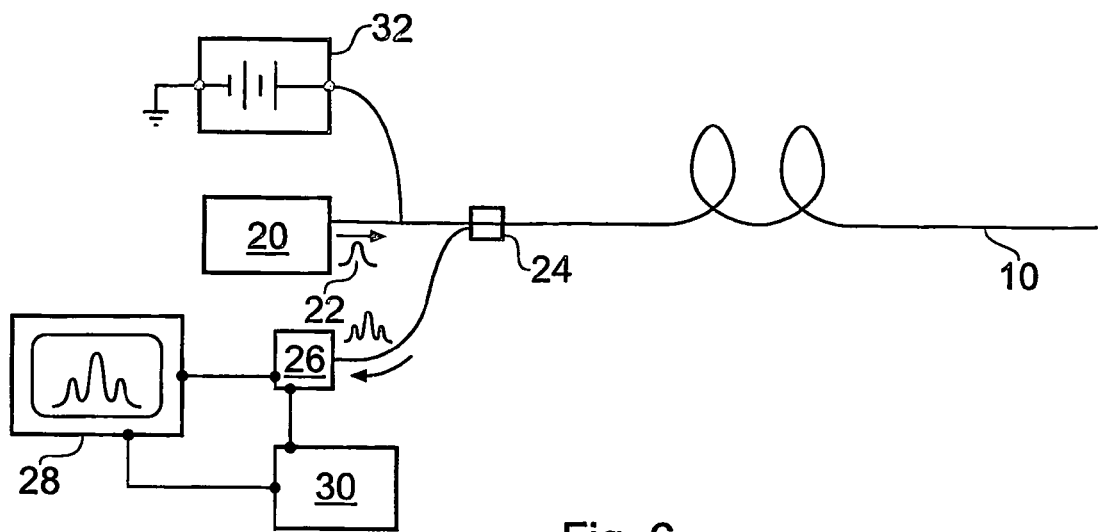
FIG. 6 shows fluid flow monitoring apparatus comprising the fibre of FIG. 1 arranged as a DTS system.

FIG. 6 is a schematic diagram of apparatus suitable for obtaining such a distributed measurement from an optical fibre with a heatable coating. An optical source 20 is operable to generate pulses of light 22, which are coupled into a first, proximal, end of the optical fibre 10. The optical fibre 10 is provided with an optical coupler 24 towards its first end which is arranged to couple back-scattered light arising from Raman scattering out of the fibre 10 (and hence away from the optical source 20) and to a photodetector 26. The coupling is straightforward to achieve with known devices such as a wavelength division multiplexer, because of the difference in wavelength between the original pulse and the Raman scattering. The photodetector 26 generates a signal representing the amplitude of the detected light, which is supplied to a display device 28, which displays the signal for observation by a user if desired. A processor 30, such as a computer or suitable circuitry, is also provided and arranged to receive the photodetector signal and process it as desired, for example by performing calculations to convert time into distance along the fibre, and looking for fluctuations in the amplitude of the detected light. This combination of display device 28 and processor 30 is merely exemplary. Any preferred arrangement of data processing, data storage, data display and similar apparatus can be utilised as required to obtain output from the fibre in a desired form.

Also comprised within the apparatus of FIG. 6 is a power supply 32 connected to the heatable coating of the optical fibre 10 and to ground, and operable to apply a voltage across the coating and thereby cause current to flow to heat the coating. Meters for measuring and/or controlling the current and voltage (not shown) can also be provided, to control the level of electrical power supplied to the coating. Further, connections can optionally be provided between the processor 30 and the power supply 32 and meters, so that, for example, the electrical power can be controlled in response to the temperature measurements, and/or the voltage and current measurements can be incorporated with optical data obtained from the fibre 10.

To monitor fluid flow, the coated fibre is disposed along a pipe, channel, conduit or similar through which a fluid of interest is arranged to flow. Voltage is then applied to the heatable coating, so that heat is generated and transferred to the fluid. One or more temperature profiles are obtained in the above-described manner, and studied for any changes or anomalies caused by peculiarities or alterations in the fluid flow. Thus the axial position of these flow features along the fibre length can be determined. With a sufficient length of fibre, the entire extent of a particular pipe can be studied. Alternatively, shorter fibre lengths can be used to investigate sections of the pipe.

Figure 7:
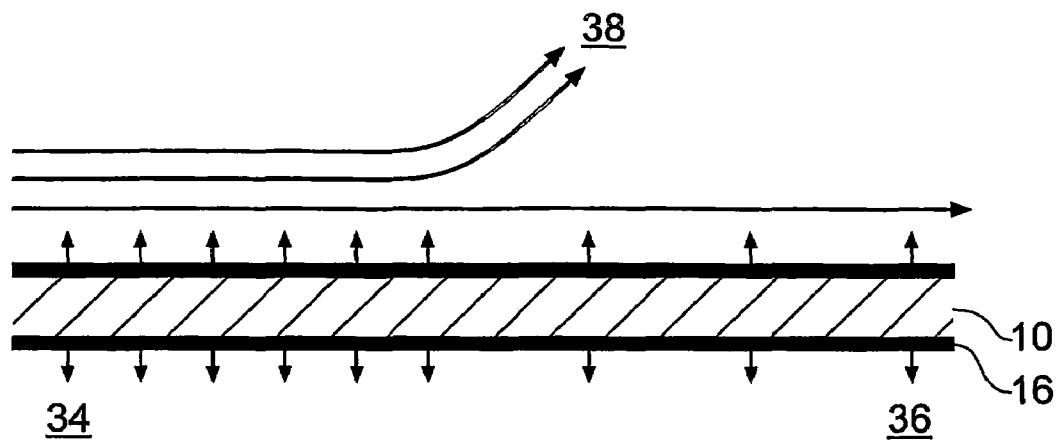
FIG. 7 shows a longitudinal cross-sectional view of the fibre of FIG. 1 in use to monitor fluid flow.

FIG. 7 is a schematic representation of a fibre 10 having a heated heatable coating 16 disposed within a region of fluid having a flow anomaly. The generally horizontal lines represent fluid flow. Flow is greater at the left hand side 34 of the fibre (as drawn) than at the right hand side 36, owing to a fluid outflow 38 (such as a leak or a branch in a pipe) at the midway point. Thus, a smaller amount of heat (represented by the small vertical arrows) is transferred from the coating to the fluid at the right hand side than at the left hand side. Heating of the coating is uniform over the fibre length, so that the heat transfer results in the left hand side of the fibre being cooler than the right hand side.

Figure 8:
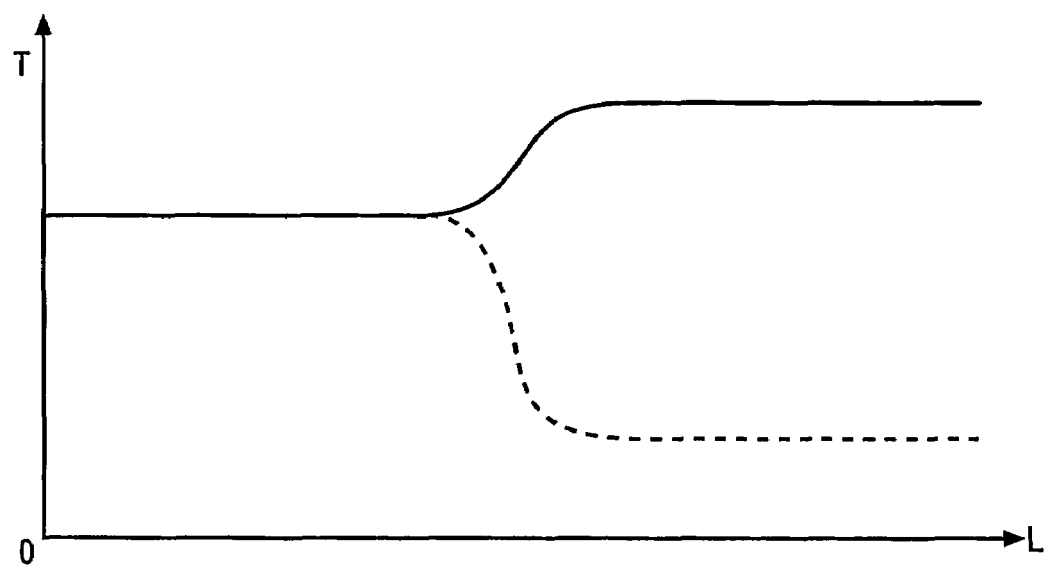
FIG. 8 shows distributed temperature profiles obtained from the fibre of FIG. 1 when used as a DTS system to monitor fluid flow.

FIG. 8 is a representative temperature profile of the fibre of FIG. 7. The solid line indicates the temperature over the fibre length, and shows the higher temperature at the right hand end. The position of the fluid outflow is evident from the step change increase in temperature at the central point of the fibre.

Also shown in FIG. 8 is a dotted line showing a decrease in temperature at the right hand end. This is the profile that would be obtained from an inflow of fluid at the central point of the fibre. The greater size of the step change compared to the solid line shows that the inflow of fluid is greater than the outflow shown by the solid line.

A change can also occur if there is a narrowing or constriction in a pipe or conduit in which the fluid is flowing. A decrease in the width of the pipe will result in an increased flow, so that the coating temperature drops due to increased heat transfer. Thus a decreasing change such as that represented by the dotted line in FIG. 8 is observed. This can be used to locate blockages or damage in the conduit, if it is reasonable to assume that no inflow is occurring.

A fibre sensor according to the first embodiment can be used for monitoring flow in many situations. A fibre can be permanently deployed and used to take measurements periodically to detect any unexpected changes in flow, or to ensure that flow is behaving as required. Alternatively, unexpected events can be specifically investigated by deploying a fibre in a particular pipe, and taking a measurement to determine the location and/or size of the problem.

One application is the monitoring of the flow of oil, gas and water within the well bore of an oil well. The first embodiment is well-suited to this for several reasons. Optical fibres are proven for downhole use in the oil industry, as they are robust, compact, and can withstand the rigours of temperature and pressure that are found within a well bore. Further, the distributed aspect of this embodiment allows the full depth of a well to be monitored with a single fibre if necessary. The fibre can be deployed downhole and maintained in place over the long term to allow continuous monitoring, or can be arranged for short term deployment as and when required. A suitable technique for installing the fibre is to use high pressure fluid to pump it into a closed hydraulic system extending from the surface down into the well bore [6].

Figure 9:
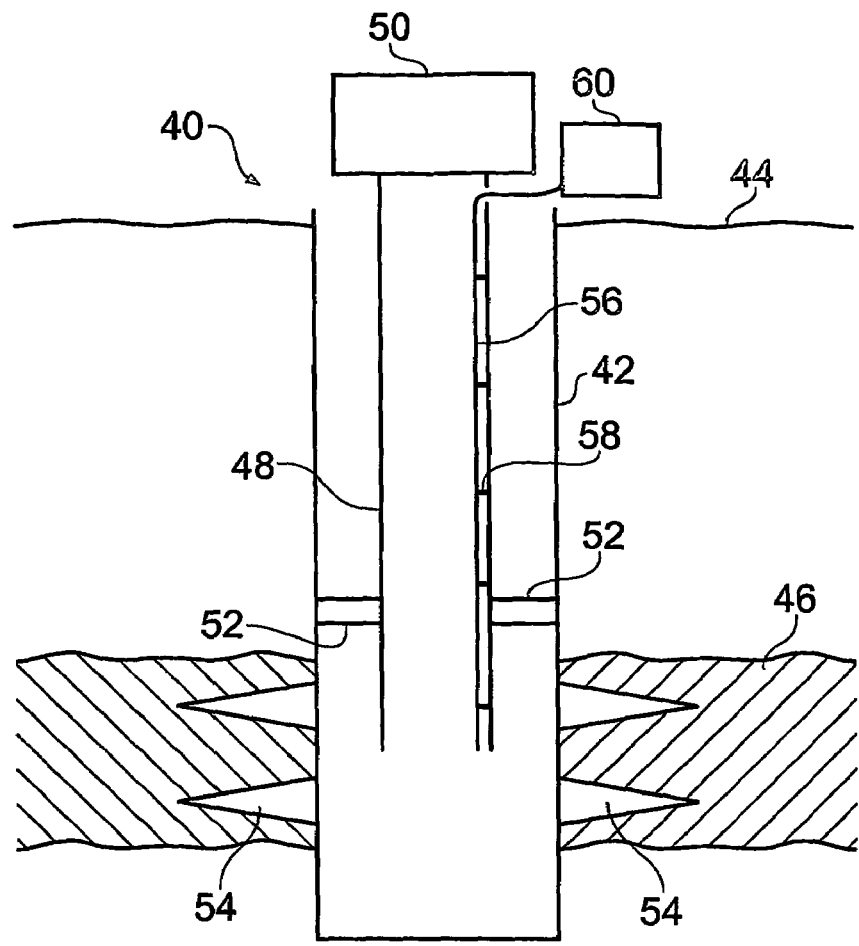
FIG. 9 shows a schematic view of an oil well having the fibre of FIG. 1 installed to monitor oil flow within a production tubing of the oil well.

FIG. 9 shows a simplified schematic vertical cross-sectional view of an oil well, illustrating some basic features. The oil well, or well bore 40 comprises an outer casing 42 sunk into the ground 44, and penetrating through a hydrocarbon reservoir 46, the contents of which are to be extracted using the well 40. Disposed with the casing 42 is a production tubing 48, which is used to carry oil upwards from the reservoir 46 to the surface. The production tubing 48 is open at its lower end, and is held is place within the casing 42 by a packer 52. A well head 50 is located at the top end of the production tubing 48, and contains equipment used to extract the oil, such as pumping equipment and controls for valves and the like (not shown). Oil flows from the reservoir 46 into the casing 42 and then up the production tubing 48 by way of perforations 54 extending through side walls of the casing 42 and into the reservoir 46.

Also shown in FIG. 9 is an optical fibre installation for monitoring fluid flow, according to the first embodiment. An optical fibre with a heatable coating is arranged within a protective fibre deployment tube 56. The deployment tube 56 runs down the length of the inner surface of the production tubing 48, and is attached thereto by a number of fasteners 58. The deployment tube 56 preferably contains material that will ensure good thermal contact between the fibre within the deployment tube 56 and fluid flowing in the production tubing 48. The deployment tube and fibre may alternatively be arranged on the outer surface of the production tubing 48. In this case the deployment tube 56 should be fastened to the production tubing 48 in such a way as to give the required thermal contact between the fibre and the fluid, taking the wall of the production tubing 48 into account. A control unit 60 connected to the upper end of the optical fibre installation is provided outside the well bore 40. The control unit 60 contains equipment for operating the fibre sensor such as that shown in FIG. 6, including a laser or similar optical source to generate light pulses for propagation along the fibre, a detector to detect back scattered light emitted from the fibre, a processor, and also fibre deploying apparatus to feed the fibre into the deployment tube 56, and extract it therefrom, such as the above-mentioned hydraulic system.

Alternatively, the fibre can be arranged exterior to the casing 42. Also, the fibre may be deployed directly into the well bore without the use of a deployment tube, for example by fastening it possibly in some kind of housing) to the tubing or casing as the well bore is constructed, so that the fibre is permanently installed. In addition, the fibre may be deployed as part of an intervention assembly into the well.

Monitoring of the fluid flow in the production tubing is useful to maintain production volume and have warning of any problems arising within the well. The flow rate will vary with depth within the well, determined by factors such as influx of oil, water or gas from the various formations through which the well bore passes, and widenings and narrowings of the production tubing where valves and the like are positioned. Once the temperature/flow profile for regular operation of the well is established using the coated fibre, any changes can be detected, and investigated if believed significant. For example, the onset of scale formation can clog perforations and narrow the production tubing, and hence reduce flow, as can failure of various components of the well bore.

On the other hand, a build-up of scale within the production tubing will reduce the tubing diameter and hence increase the flow velocity at that locality. This will appear as a decrease in the temperature profile as described above with respect to FIG. 8. Thus, monitoring for such changes can be used to detect scale deposits. Early identification of the onset of scale is very important, since scale deposition can proceed very rapidly and reduce oil production to little or nothing.

A further application is the location of leaks. If the presence of a leak in a pipe or similar is known or suspected, it is beneficial to be able to pinpoint its location. A technique for doing so utilising the first embodiment will now be described.

Figure 10:
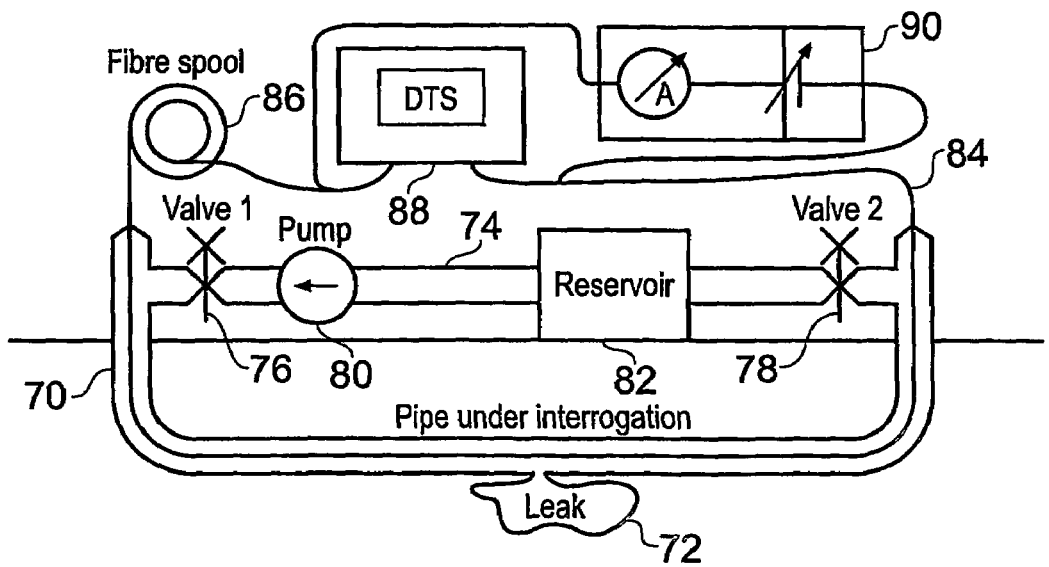
FIG. 10 shows a schematic view of the fibre of FIG. 1 in use as a leak locator.

FIG. 10 is a schematic representation of a leaking pipe and apparatus according to the present invention in place for leak location. An underground pipe 70 has a leak 72. The accessible ends of the pipe are connected by a further pipe 74 fitted with an input valve 76 and an output valve 78, and a pump 80 and a reservoir 82 arranged between the valves 76, 78. The valves, pump and reservoir may already be in place as part of a water management system, or alternatively these components can be temporarily installed for leak location to be carried out.

Optical fibre flow monitoring apparatus comprises a coated optical fibre 84 stored on a spool 86, a DTS unit 88 for operating the fibre as a distributed temperature sensor (containing an optical source, detector, etc as described above) and a variable power supply 90 to heat the coating.

To perform the leak location test, water (or an alternative fluid) is pumped into the pipe 70 using pump 80, and the optical fibre 84 is arranged through the length of the pipe 70, possibly also by pumping. The fibre 84 is coupled to the DTS unit 88, and also connected to the variable power supply 90. Once the pipe network is full of water, the pump 80 is stopped, and a temperature profile of the fibre 84 is recorded before any current is supplied to the heatable coating. The pump is then switched on, the input valve 76 opened and the output valve 78 closed. Thus all water pumped from the reservoir 82 to the pipe 70 feeds the leak 72, so that outflow from the pipe 70 via the leak 72 is significant. The fibre temperature is then continuously monitored while the pump 80 is operating. The power supply is switched on to cause current to flow through the heatable coating and heat it up, and the voltage and/or current is gradually increased until a clear discontinuity, or change, is evident in the temperature profile. This indicates the position of the leak 72.

Fluid inflows and blockages can be located in a similar way.

Second Embodiment

A second embodiment of the present invention uses an alternative arrangement of an optical fibre having a heatable coating to monitor or measure fluid flow. In this example, the heatable coating is heated by optical power, and is positioned on an end facet of the fibre. This allows localised, single point measurements to be made. Also, the use of optical power to achieve the heating removes the requirement for electrical power.

Figure 11:
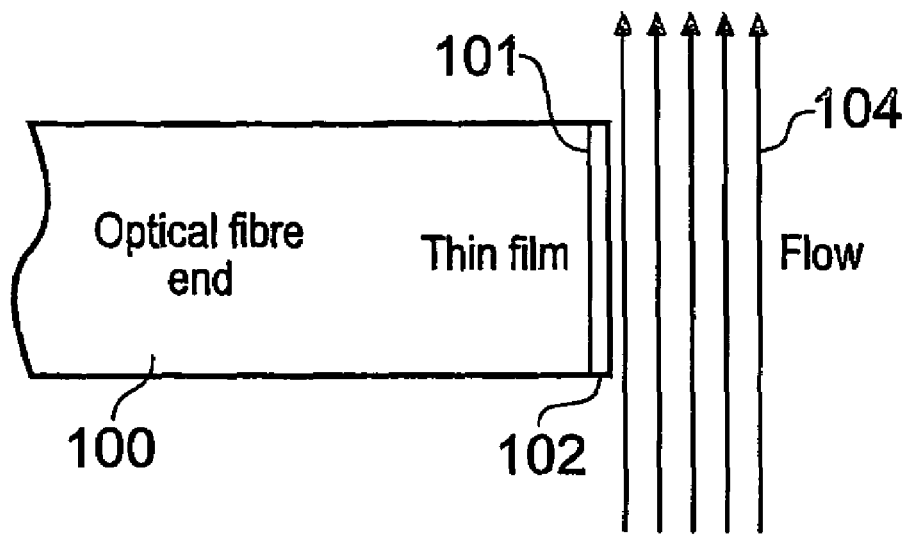
FIGS. 11 and 12 show schematic side views of an optical fibre according to a second embodiment of the present invention.

FIG. 11 is a schematic representation of an optical fibre sensor according to the second embodiment. An optical fibre 100 has an end 101 arranged to be placed in a fluid flow. The end 101 is the distal end of the fibre 100 with respect to the user, and has an end facet provided with a thin film coating 102. The coating is of a material that undergoes thermal expansion, so that its optical length (optical thickness of the coating) is a function of temperature. Thus a measurement of its optical length is an indication of its temperature, which gives an indication of the fluid flow via the cooling effect of the fluid. The fibre end 101 is shown positioned in flowing fluid 104 with the longitudinal axis of the fibre 100 transverse to the direction of flow.

Figure 12:
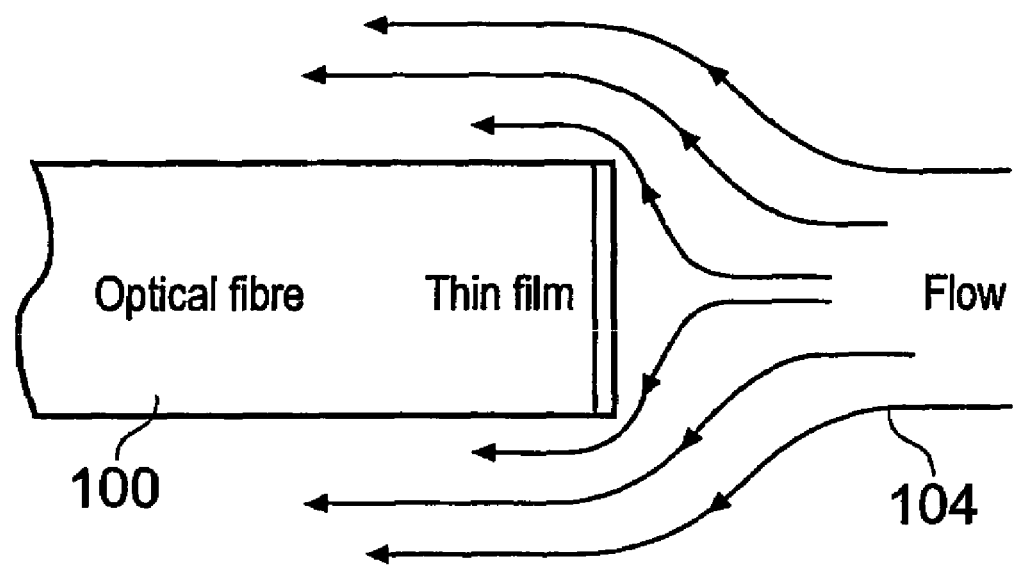

FIG. 12 shows the same fibre 100 arranged in the orthogonal direction, so that the axis of the fibre is parallel to the direction of flow. Either arrangement may be used.

The second embodiment is able to utilise optical signals for both heating the heatable coating, and for determining the temperature of the heatable coating. To measure the temperature of the coating, an optical signal having a wavelength that is not greatly absorbed by the heatable coating is launched into the proximal end of the fibre. This light travels along the fibre to the distal end and is reflected from the heatable coating. The reflected light travels back along the fibre to the proximal end where it is emitted and detected. The coating acts as a Fabry Perot etalon, so that the amount of light reflected depends on the optical thickness of the coating. This thickness varies with temperature owing to thermal expansion, so the amount of light detected at the proximal end gives an indication of the temperature of the coating.

To use the heatable coating as a heating element, an optical signal having a wavelength for which the optical absorption of the coating is high is launched into the fibre, propagates along and is absorbed by the coating, thus raising its temperature. When placed in the flowing fluid of interest, the final temperature of the film depends on the temperature of the fluid and the fluid velocity, owing to thermal transfer from the coating to the fluid.

Thus, the fibre can be used as an anemometer by injecting two different optical signals into the proximal end: one to measure the temperature (at a wavelength having low absorption) and the other to heat the thin film coating (at a wavelength having high absorption). The use of two different wavelengths simplifies detection of the light reflected from the coating, because this light can be readily distinguished from any of the light used for heating which may be back-scattered to the detector from points within the fibre. Alternatively, a single optical signal can be used, having a wavelength which is partially absorbed by the coating and partially reflected.

This embodiment of the invention can be operated in a similar manner to a hot wire anemometer, which also provides localised measurements, and can be similarly calibrated.

Figure 13:
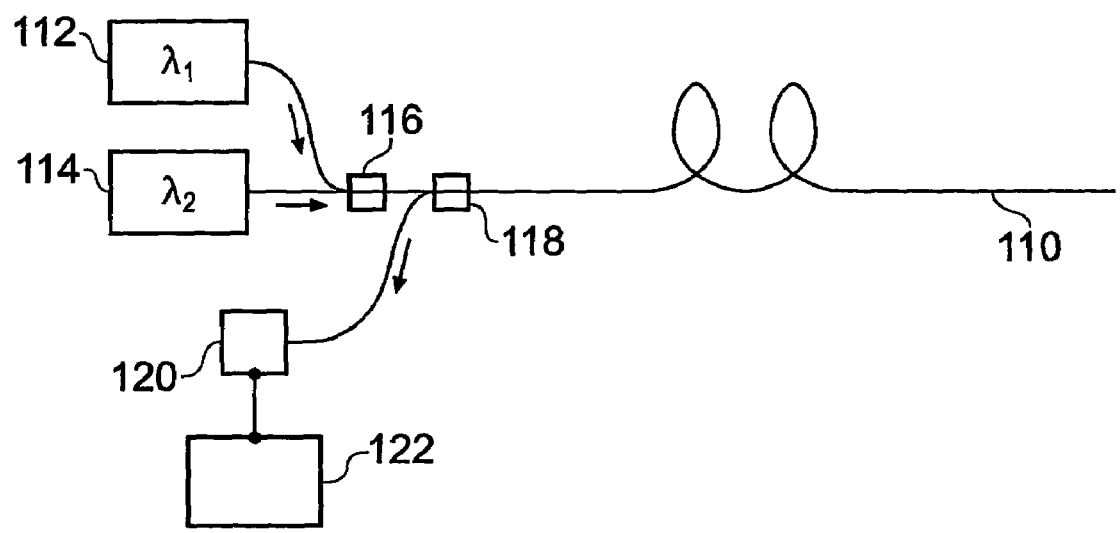
FIG. 13 shows a schematic view of flow monitoring apparatus comprising the fibre of FIGS. 11 and 12.

FIG. 13 is a schematic diagram of apparatus suitable for implementing the second embodiment of the invention. A fibre 110 having a heatable coating at its distal end (not shown) is provided, together with a first optical source 112 operable to generate light at a wavelength $\lambda_1$ having a high absorption in the heatable coating and a second optical source 114 operable to generate light at a wavelength $\lambda_2$ having a low absorption in the heatable coating. The optical sources 112, 114 are arranged such that their outputs can each be coupled in the proximal end of the fibre 110, via an input optical coupler 116.

An output optical coupler 118 is also provided, and arranged to couple light at wavelength $\lambda_2$ that has been reflected from the heatable coating out of the proximal end of the fibre 118, away from the optical sources 112, 114 and onto a photodetector 120. The photodetector 120 generates a signal representative of the amount of light detected, which, as described, is indicative of the coating temperature, which is in turn indicative of the flow of fluid in which the distal end of the fibre is placed. The photodetector signal is passed to a processor 122, that can be configured to perform functions such as conversion of the signal into a desired form, storage of the signal, and comparison of the signal with previous signals to detect changes in flow. Also, the processor 122 may possibly be connected to the optical sources 112, 114 to control when and how much light at each wavelength is launched into the fibre 110. Thus a fully automated system can be provided, that is operable to take and compare measurements at predetermined times, and possibly raise an alarm in the event of a particular flow event or pattern being detected.

In an alternative configuration, the optical sources 112 and 114 are replaced by a single optical source (not shown) operable to generate light at a wavelength that has an intermediate absorption in the heatable coating, and that can hence be used for both heating and temperature measurement.

The principle of operation of the sensor is now described, considering the case of separate wavelengths for heating and measuring temperature.

The optical absorption coefficient $\alpha$ of a material, in this case the heatable thin film coating, is given by $$\alpha = (1/l)\ln(I_0/I(l))$$

where $I_0$ is the initial incident optical intensity and l is the distance into the material. If the intensity is considered to decay exponentially (a typical situation), the absorption coefficient is independent of the distance. The penetration depth D is defined as the distance within which the optical power falls to 1/e of its original value, given by $D=1/\alpha$. The absorption coefficient typically varies with wavelength.

Figure 14:
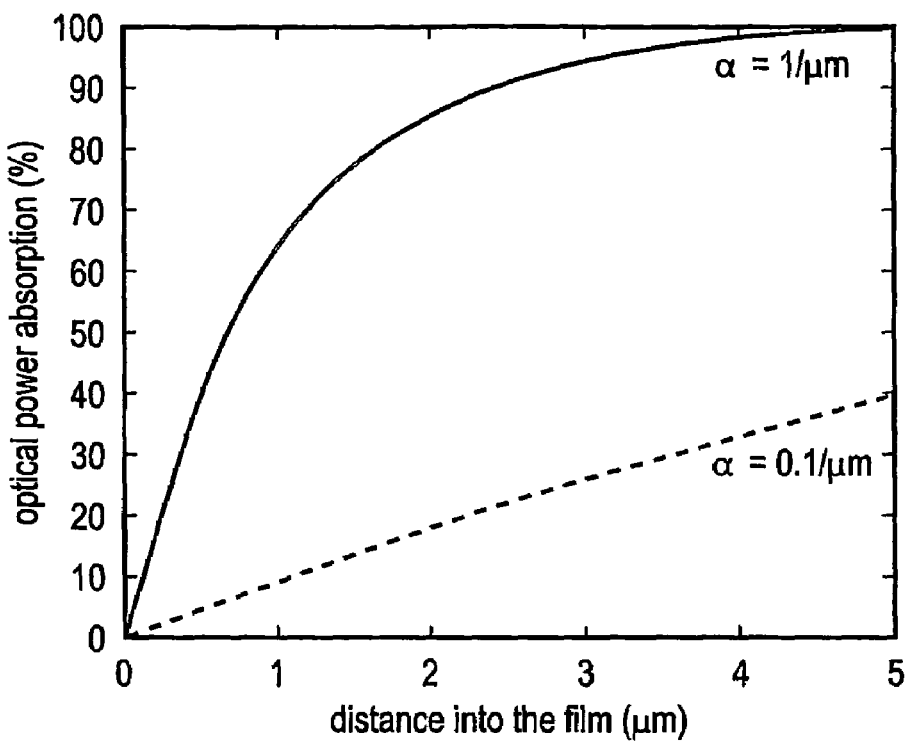
FIG. 14 shows plots of the variation of optical power absorption with distance into a thin film coating on the fibre of FIGS. 11 and 12, for coatings with different optical absorption coefficients.

FIG. 14 shows a plot of the percentage of optical power absorbed by the coating as a function of its thickness for two values of absorption coefficient $\alpha$: 0.1 $\mu m^{-1}$ (D=10 $\mu m$) and 1 $\mu m^{-1}$ (D=1 $\mu m$). From this it can be seen that if, for example, the coating presents an absorption coefficient of 1 $\mu m^{-1}$ at a first wavelength $\lambda_1$ and an absorption coefficient of 0.1 $\mu m^{-1}$ at a second wavelength $\lambda_2$, light at wavelength $\lambda_1$ could be used to heat the coating, while light at wavelength $\lambda_2$ could be used to measure the temperature of the coating. If the coating has a thickness of 2 $\mu m$, FIG. 14 indicates that the optical power absorbed would be more than 80% at $\lambda_1$, but less than 20% at $\lambda_2$.

Figure 15:
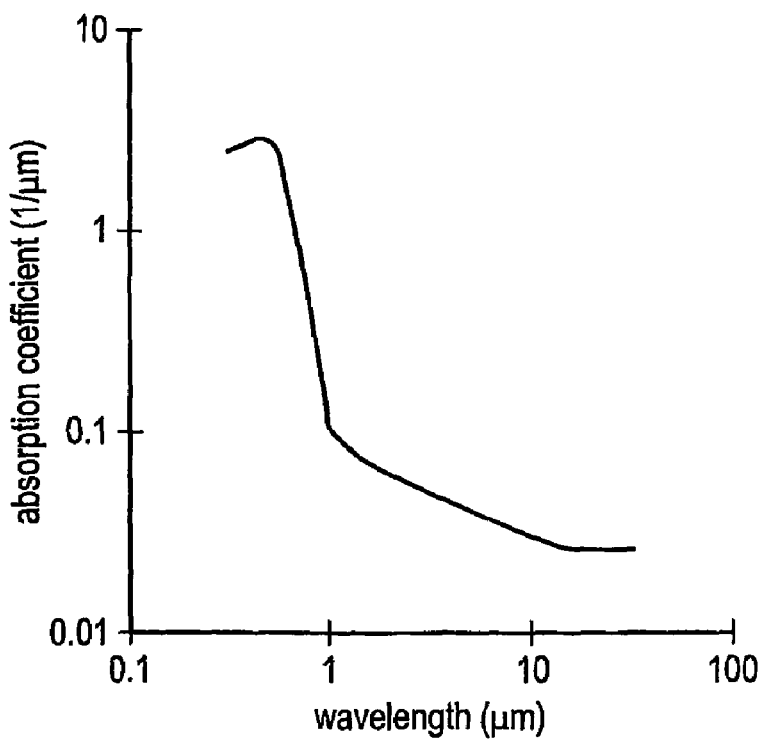
FIG. 15 shows a plot of the absorption coefficient of diamond-like carbon.

A suitable material for the heatable coating, showing the desired absorption characteristics, is diamond-like carbon (DLC). FIG. 15 shows its absorption coefficient as a function of wavelength. This greater than 1 $\mu m^{-1}$ at 780 mm, and drops off to a near constant lower level in the infrared so that it is less than 0.1 $\mu m^{-1}$ at 1310 nm and 1550 nm. These wavelengths are generated by commercially available semiconductor lasers.

Other materials also have suitable absorption properties. Germanium is highly absorbing at visible wavelengths and transparent at infrared wavelengths. Materials such as zinc selenide present low absorption in the infrared, but absorption peaks can be introduced by allowing the material to retain water so that OH ion resonance peaks are present.

Figure 16:
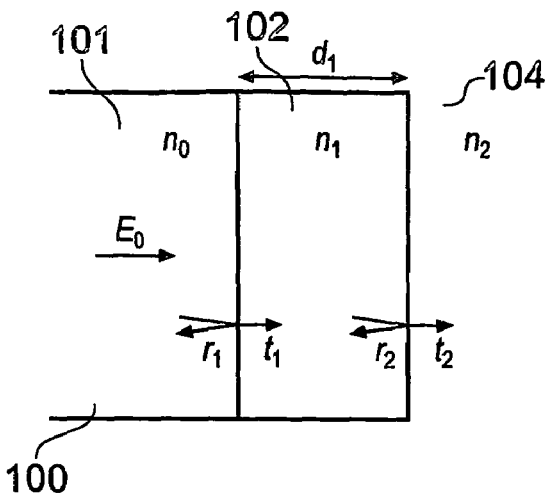
FIG. 16 shows a schematic view of a coated end of the fibre of FIGS. 11 and 12 illustrating how incident light is reflected from the coating.

FIG. 16 shows a detailed view of a fibre end 101 having a heatable coating 102. For light used to measure the coating temperature and incident on the coating 102 from the fibre 100, the phase shift $\delta$ introduced by the coating, considered as a thin film, is given by $$\delta = (2\pi/\lambda_0)[(n_1+\beta\Delta T)(d_1+\epsilon\Delta T)] + id_1\alpha/2$$

where $d_1$ is the thickness of the coating, $n_1$ is the refractive index of the coating, $\lambda_0$ is the wavelength of the light in a vacuum, $\alpha$ is the absorption coefficient, $\epsilon = \Delta d/\Delta T$ is the coefficient of thermal expansion of the coating, and $\beta = \Delta n/\Delta T$ is the thermo-optical coefficient of the coating.

In a dispersive material, in which the refractive index is wavelength-dependent, the absorption coefficient is also wavelength dependent. The relationship between absorption coefficient and refractive index is given by the Kramers-Kronig equations for the material. A stronger variation of refractive index and hence optical length with temperature may be obtained at wavelengths where there are variations of absorption coefficient with temperature and wavelength. This effect can provide a variation of optical path length with temperature at regions of anomalous dispersion.

The total electric field reflection coefficient for the coating at temperature T depends on the phase shift $\delta$ and is given by $$r_T = (r_1 + r_2 e^{-2i\delta})/(1 + r_1 r_2 e^{-2i\delta})$$

where $r_1$ represents reflection at the interface between the fibre 100 (with refractive index $n_0$) and the coating 102 (with refractive index $n_1$), given by $r_1 = (n_0-n_1)/(n_0+n_1)$, and $r_2$ represents reflection at the interface between the coating 102 and the adjacent medium, for example the fluid 104 (with refractive index $n_2$), given by $r_2 = (n_1-n_2)/(n_1+n_2)$. See FIG. 16, in which $t_1$ and $t_2$ represent the transmission at the two interfaces. The reflectivity $r_2$ can be made approximately equal to $-1$ by covering the coating with a high reflection coating (such as by metallisation) or a layer of high refractive index material. The total optical power reflection coefficient $R_T$ is given by $R_T = |r_T|^2$.

Zinc selenide, suggested above as a suitable coating material, has a high thermo-optic coefficient, $\beta = 10^{-4}$. Taking the example of light generated from a 20 mW laser diode operating at 780 nm, and a zinc selenide film of thickness 2.4 $\mu m$, a variation of reflected optical power with temperature of 1.75 $\mu W/°$ C. is expected. 1.75 $\mu W$ is an amount of light that is detectable using standard photodiodes and electronics, so that coating temperature variations of 1° C. and above can be detected using conventional equipment.

Figure 17:
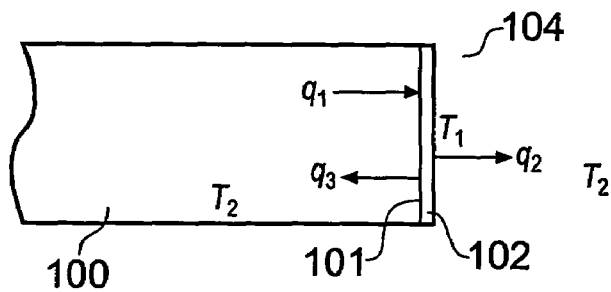
FIG. 17 shows a schematic view of the coated end of the fibre of FIGS. 11 and 12 illustrating various heat fluxes that occur then the coating is heated.

The mathematical principles behind the thermal operation of the second embodiment are similar to those presented above for the first embodiment. FIG. 17 is a schematic representation of a coated fibre end immersed in fluid, showing the relevant factors. The fibre and fluid are assumed to have a temperature $T_1$, and the heated coating a temperature $T_2$. A heat flux $q_1$ is provided to the coating by the incident heating light, a heat flux $q_2$ is the heat transfer from the coating to the fluid and a final heat flux $q_3$ flows from the coating to the fibre.

$q_1$ depends on the optical power $P_a$ absorbed by the coating, according to $$q_1 = P_a/\pi r_2$$

where r is the fibre core radius. This assumes that most of the absorbed optical power is transformed into heat.

$q_2$ is given by $$q_2 = Nu(k_f/d)\Delta T$$

where $k_f$ is the thermal conductivity of the fluid, d is the fibre cladding diameter and $\Delta T = T_1 - T_2$.

$q_3$ may be neglected for a silica fibre, because the thermal conductivity of silica is low. However, it is included here for the sake of completeness, assuming that the temperature of the fibre is the same as that of the fluid at a distance of one fibre diameter from the fibre end. Thus, $$q_3 = Nu_s(k_s/d)\Delta T$$

where $k_s$ is the thermal conductivity of the fibre, and $Nu_s$ is the Nusselt number for a flat solid ($Nu_s = 1$).

At equilibrium, the optical power absorbed by the coating to maintain a temperature difference $\Delta T$ between the film and the fluid can hence be shown to be $$P_a = (\Delta T(\pi r_2)/d)(Nu k_f + Nu_s k_s)$$

Figure 18:
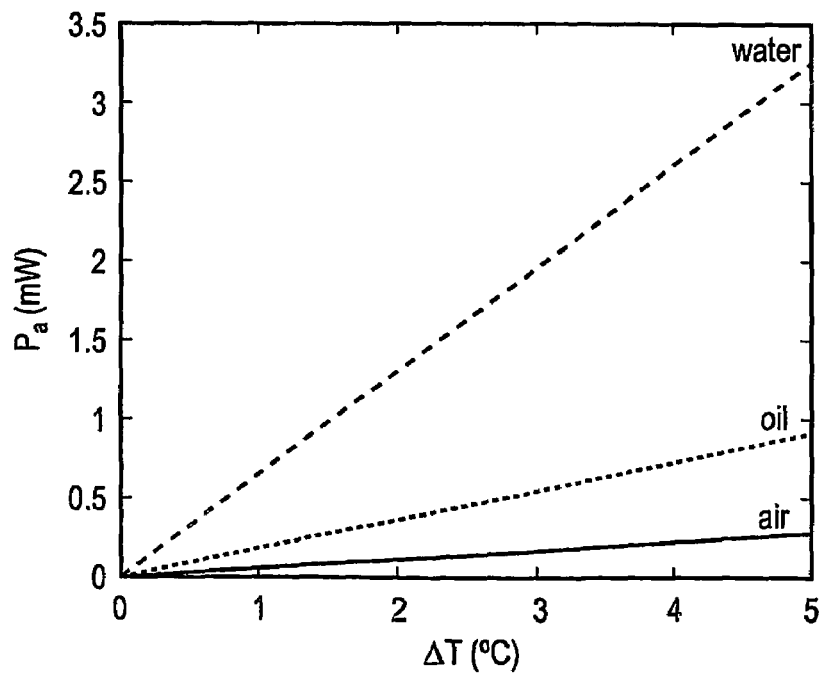
FIG. 18 shows plots of the variation of optical power absorbed by the coating with temperature difference between the coating and a surrounding flowing fluid, for various fluids.

FIG. 18 shows a graph of the optical power $P_a$ absorbed by the coating as a function of the temperature difference, for a fluid velocity of 5 m/s, for water (upper curve), oil (middle curve) and air (lower curve).

Figure 19:
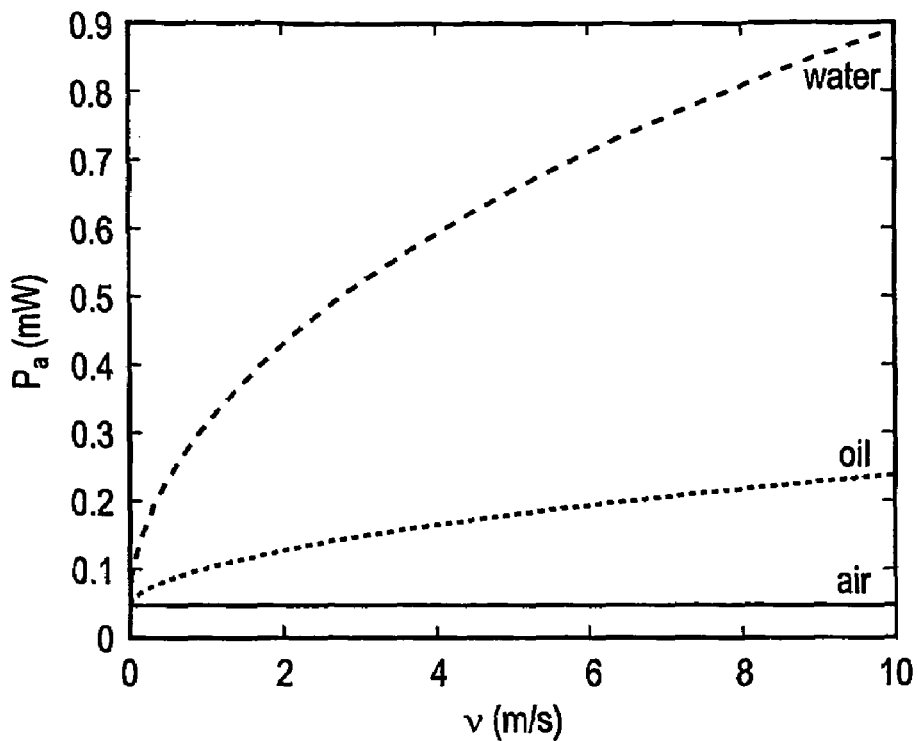
FIG. 19 shows plots of the variation of optical power absorbed by the coating with fluid flow velocity, for various fluids.

FIG. 19 shows a graph of the optical power $P_a$ as a function of the fluid velocity if $P_a$ is controlled in order to maintain a constant temperature difference of 1° C., again for water (upper curve), oil (middle curve) and air (lower curve).

Figure 20:
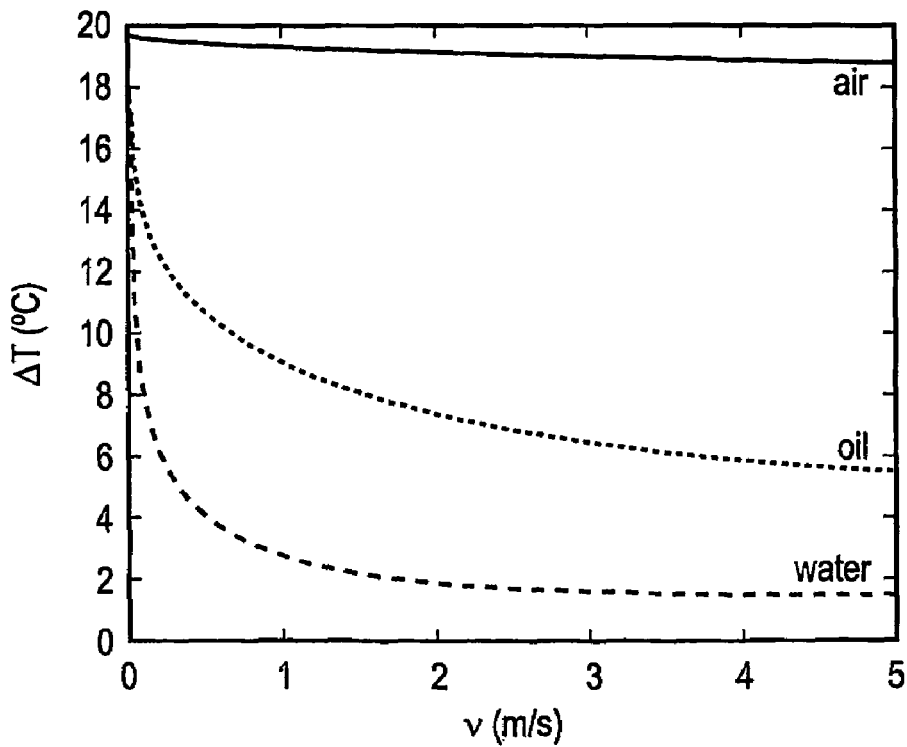
FIG. 20 shows plots of the temperature difference between the coating and the fluid with flow velocity, for various fluids.

FIG. 20 shows a graph of the temperature difference as a function of fluid velocity, resulting from optical power absorbed by the heatable coating of 1 mW, for air (upper curve), oil (middle curve) and water (lower curve). From this is can be seen that temperature variations above 1° C. are readily obtainable, even for relatively rapidly flowing fluid having a high cooling effect, such as water.

The data shown in FIGS. 18, 19 and 20 were derived using parameters as follows:

Fibre: $r=50\times10^{-6}$ m; $d=125\times10^{-6}$ m

Air: $k_f=24\times10^{-3}$ $Wm^{-1}K^{-1}$; $\mu=18\times10^{-6}$ $Nsm^{-2}$; $\rho=1.29$ $kgm^{-3}$; $c=1000$ $Jkg^{-1}K^{-1}$ Water: $k_f=0.61$ $Wm^{-1}K^{-1}$; $\mu=1\times10^{-3}$ $Nsm^{-2}$; $\rho=1000$ $kgm^{-3}$; $c=4000$ $Jkg^{-1}K^{-1}$ Oil: $k_f=0.13$ $Wm^{-1}K^{-1}$; $\mu=2.5\times10^{-3}$ $Nsm^{-2}$ at $T=25°$ C.; $\rho=900$ $kgm^{-3}$; $c=1700$ $Jkg^{-1}K^{-1}$ Thus it is possible via the second embodiment to provide a fibre anemometer that can be operated at readily available wavelengths by using optical signals for both heating and measurement. A particular advantage is the absence of electric currents, so that the sensor can be safely operated in environments in which the risk of explosion is high without the need for electrical insulation, which can be bulky, can inhibit operation of the insulated device, and may fail. This is particularly advantageous for use in the oil industry. A fibre sensor according to the second embodiment can be permanently maintained within a well bore at a specific location of interest, to detect any changes in flow velocity at that location. Alternatively, the sensor can be introduced into the well bore when a measurement is required, or can be moved between locations to obtain a series of measurements. Also, the use of optical fibre, which is available in great lengths, allows localised measurements to be made at remote locations. Of course, a device according to the second embodiment can similarly be used to measure for other flow measurement applications, for monitoring of any kind of fluid.

Further Embodiments

Two specific embodiments have been described hereabove in detail. However, different configurations of optical fibres with heatable coatings are also contemplated, such as an electrically heated end coating, powered via wires running along the outer surface of the fibre. Conversely, optical heating may be employed to heat a longitudinal surface coating. To achieve this, the coating should be optically absorbing at a given wavelength, and light at this wavelength can then be launched at relatively high power into the cladding of the fibre. Optical loss from the cladding will allow light to transfer to the coating, where it will be absorbed, resulting in heating of the coating.

With regard to the configuration of the second embodiment, with an optical thin film coating over the distal end facet of the fibre, the temperature may be monitored using optical characteristics other than optical path length. For instance, some materials have an index of refraction or an absorption coefficient that varies with temperature and which will modify the reflected light. Thus, optically interrogating the coating so as to detect changes in these parameters will reveal changes in temperature indicative of flow changes.

As described with respect to the second embodiment, the end facet coating is a single layer with both the absorptive and reflective qualities needed for heating and temperature measurement. However, this may alternatively be achieved by providing the coating in two layers, one performing the reflective function and the other the absorbing function. This means that the materials for the two layers can be individually selected to provide particularly advantageous absorption and reflection properties. The coating may thereby be better matched to a particular wavelength or wavelengths that are desired for use in the fibre sensor.

In a further embodiment, the distal end facet of the fibre is cut or formed to have a specific shape before the coating is applied, in contrast to the simple transverse cleave shown in FIGS. 11 and 12. For example, the fibre end may be cleaved at an angle, or it may be ground or otherwise machined into a curved, rounded profile. Shaping in this way may be used to tailor the optical behaviour of the fibre, such as the reflective or focusing properties of the fibre end, so that the heating and temperature measuring functions can be optimised for particular operating conditions.

It is also possible in some cases to use the various embodiments of the sensor apparatus to infer the type, composition or other properties of the fluid being monitored. In the case of a fibre deployed within an oil well in a completion with a geological structure in which the positions of inflows and potential inflows are known, inflows of various fluids (oil, gas and water) can be identified by the fact that they are likely to have different temperatures and hence will produce different amounts of cooling of the heatable coating. Thus, continuous monitoring can be used to detect gradual or sudden changes in fluid identity. This can pick up any sudden and unwanted influx of water, for example. Also, the various fractions of oil, gas and water in the overall fluid composition can be inferred. The so-called oil content ratio, being the proportion of oil compared to the fluid as a whole (and similarly for gas and water) is an important parameter required for efficient oil production management.

Coatings, both end and surface, that can be heated by methods other than the application of electrical or optical power may be used, for example, coatings that heat up in response to exposure to acoustic or non-optical frequency electromagnetic energy. Also, outer surface and end facet coating embodiments may be combined, to provide a single fibre anemometer operable to provide both distributed and localised readings.

REFERENCES

[1] L. V. King, "Precision measurement of air velocity by means of the linear not-wire anemometer", *Phil. Mag.*, Series 6,29, p. 599-604 (1915).
[2] WO 00/111317
[3] WO 99/45235
[4] WO 01/75403
[5] WO 01/04581
[6] US RE37,238 E

The invention claimed is:

1. A method of monitoring fluid flow comprising:
   providing an optical fibre having a heatable coating comprising optically absorbing material, the heatable coating provided as a layer around the outer surface of the optical fibre extending axially along the optical fibre;
   disposing the optical fibre so that the heatable coating is in thermal contact with flowing fluid;
   heating the heatable coating, by exposing the heatable coating to light at a wavelength that is absorbed by the optically absorbing material, so that heat is transferred from the coating to the fluid;
   launching light into the optical fibre;
   detecting light from the optical fibre;

processing the detected light to obtain information indicative of the temperature of the heatable coating, where the temperature of the heatable coating depends on the flow; and using the information indicative of the temperature of the heatable coating to derive information about the flow.

2. A method according to claim 1, in which the temperature of the heatable coating depends on the rate of flow or flow velocity, and the information indicative of the temperature of the heatable coating is used to derive information about the rate of flow or flow velocity.

3. A method according to claim 1, in which the temperature of the heatable coating depends on the type of fluid, and the information indicative of the temperature of the heatable coating is used to derive information about the type of fluid.

4. A method according to claim 1, in which the heatable coating comprises electrically resistive material, and the heatable coating is heated by passing electric current through the coating.

5. A method according to claim 4, in which the optical fibre is further provided with an electrically insulating coating covering the heatable coating.

6. A method according to claim 1, in which the heatable coating is exposed by injecting light at a wavelength that is absorbed by the optically absorbing material into cladding of the optical fibre.

7. A method according to any one of claims 1 to 2, in which the launching light, detecting light and processing the detected light comprises operating the optical fibre as a distributed temperature sensor.

8. A method according to claim 7, comprising using the information indicative of the temperature of the heatable coating to derive information about the composition of the fluid.

9. A method according to claim 8, in which the information about the composition of the fluid includes at least one of the oil content, the gas content and the water content of fluid flowing in an oil well.

10. A method according to claim 7, in which the using the information indicative of the temperature of the heatable coating to derive information about the flow comprises identifying changes in temperature along the length of the fibre, such a change indicating the location of a change in the flow of the fluid.

11. A method of monitoring fluid flow comprising:
providing an optical fibre having a heatable coating;
disposing the optical fibre so that the heatable coating is in thermal contact with flowing fluid;
heating the heatable coating so that heat is transferred from the coating to the fluid;
launching light into the optical fibre;
detecting light from the optical fibre;
processing the detected light to obtain information indicative of the temperature of the heatable coating, where the temperature of the heatable coating depends on the flow;
using the information indicative of the temperature of the heatable coating to derive information about the flow,
wherein the launching light, detecting light and processing light comprises operating the optical fibre as a distributed temperature sensor, and the using the information indicative of the temperature of the heatable coating to derive information about the flow comprises identifying changes in temperature along the length of the fibre, such a change indicating the location of a change in the flow of the fluid.

12. A method according to claim 11, in which the identifying changes in temperature comprises locating positions of inflow or outflow of fluid in the vicinity of the optical fibre.

13. A method according to claim 12, in which the monitoring fluid flow comprises locating leaks, in which:
the optical fibre is disposed within a leaking pipe; and the method further comprises, before heating the heatable coating:
allowing fluid to flow into the pipe; and
any change identified is an increase in temperature with respect to the direction of fluid flow, caused by a decreased flow of the fluid after the position of a leak.

14. A method according to claim 11, in which the identifying changes in temperature comprises locating positions of any constrictions in flow.

15. A method according to claim 11, in which the heatable coating is provided on a distal end facet of the optical fibre.

16. A method according to claim 15, in which the heatable coating comprises optically absorbing material, and the heatable coating is heated by exposing the heatable coating to light at a wavelength that is absorbed by the optically absorbing material.

17. A method according to claim 16, in which the heatable coating is exposed by injecting light at a wavelength that is absorbed by the optically absorbing material into a proximal end of the optical fibre.

18. A method according to any one of claims 15 to 17, in which launching light into the optical fibre comprises launching the light into the proximal end of the optical fibre, the light having a wavelength such that it is reflected from the heatable coating.

19. A method according to claim 18, in which the processing the detected light comprises measuring the amount of detected light reflected from the heatable coating and using this information to obtain information relating to the temperature of the heatable coating.

20. A method according to claim 18, in which the processing the detected light comprises measuring the amount of detected light reflected from the heatable coating and using this to obtain information relating to the optical thickness of the heatable coating, where the optical thickness of the heatable coating depends on its temperature.

21. A method according to claim 11, in which the heatable coating is provided as a single layer.

22. A method according to claim 11, in which the heatable coating is provided as two layers, one layer being optically absorptive and one layer being optically dependent on temperature.

23. A method according to claim 11, in which the optical fibre is disposed within a well bore.

24. Apparatus for monitoring fluid flow, comprising:
an optical fibre having a heatable coating for disposing in thermal contact with flowing fluid, the heatable coating comprising optically absorbing material and provided as a layer around the outer surface of the optical fibre extending axially along the optical fibre;
an optical power source operable to heat the heatable coating, by exposing the heatable coating to light at a wavelength that is absorbed by the optically absorbing material, so that heat is transferred from the coating to the fluid;
an optical source operable to generate light and launch the light into the optical fibre;
a photodetector operable to detect light from the optical fibre; and a processor operable to process the detected light to obtain information indicative of the temperature of the heatable coating, where the temperature of the heatable coating depends on the flow.

25. Apparatus according to claim 24, in which the processor is further operable to derive information about the flow from the information indicative of the temperature of the heatable coating.

26. Apparatus according to claim 25, in which the temperature of the heatable coating depends on the rate of flow or flow velocity, and the processor is operable to derive information about the rate of flow or flow velocity from the information indicative of the temperature of the heatable coating.

27. Apparatus according to claim 25, in which the temperature of the heatable coating depends on the type of fluid, and the processor is operable to derive information about the type of fluid from the information indicative of the temperature of the heatable coating.

28. Apparatus according to claim 24, in which the heatable coating comprises electrically resistive material, and the power source is an electrical power source operable to heat the heatable coating by passing electric current through the coating.

29. Apparatus according to claim 28, in which the optical fibre is further provided with an electrically insulating coating covering the heatable coating.

30. Apparatus according to claim 24, in which the optical power source is operable to inject light at a wavelength that is absorbed by the optically absorbing material into cladding of the optical fibre.

31. Apparatus according to claim 24, in which the optical source, the photodetector and the processor are operable to enable operation of the optical fibre as a distributed temperature sensor.

32. Apparatus according to claim 31, in which the processor is operable to derive information about the composition of the fluid from the information indicative of the temperature of the heatable coating.

33. Apparatus according to claim 32, in which the information about the composition of the fluid includes at least one of the oil content, the gas content and the water content of fluid flowing in an oil well.

34. Apparatus according to any one of claims 31 to 33, in which the processor is further operable to use the information indicative of the temperature of the heatable coating to derive information about the flow by identifying changes in temperature along the length of the fibre, such a change indicating the location of a change in the flow of the fluid.

35. Apparatus for monitoring fluid flow, comprising:
an optical fibre having a heatable coating for disposing in thermal contact with flowing fluid;
a power source operable to heat the heatable coating so that heat is transferred from the coating to the fluid;
an optical source operable to generate light and launch the light into the optical fibre;
a photodetector operable to detect light from the optical fibre; and
a processor operable to process the detected light to obtain information indicative of the temperature of the heatable coating, where the temperature of the heatable coating depends on the flow,
wherein the optical source, the photodetector and the processor are operable to enable operation of the optical fibre as a distributed temperature sensor, and the processor is further operable to use the information indicative of the temperature of the heatable coating to derive information about the flow by identifying changes in temperature along the length of the fibre, such a change indicating the location of a change in the flow of the fluid.

36. Apparatus according to claim 35, in which the identifying changes in temperatures comprises locating positions of inflow or outflow of fluid in the vicinity of the optical fibre.

37. Apparatus according to claim 36, and operable to locate leaks, in which:
the flowing fluid flows within a leaking pipe; and the apparatus further comprises:
a pump operable to pump fluid into the pipe; and
the processor is further operable to identify any change increase in temperature with respect to the direction of fluid flow, caused by a decreased flow of the fluid after the position of a leak.

38. Apparatus according to claim 35, in which the identifying changes in temperature comprises locating positions of any constrictions in flow.

39. Apparatus according to any one of claims 35 to 38, in which the heatable coating is provided on an end facet at a distal end of the optical fibre.

40. Apparatus according to claim 39, in which the heatable coating comprises optically absorbing material, and power source is an optical power source operable to heat the heatable coating by exposing the heatable coating to light at a wavelength that is absorbed by the optically absorbing material.

41. Apparatus according to claim 40, in which the optical power source is operable to inject light at a wavelength that is absorbed by the optically absorbing material into a proximal end of the optical fibre.

42. Apparatus according to claim 39, in which the optical source is operable to launch light having a wavelength such that it is reflected from the heatable coating into a proximal end of the optical fibre.

43. Apparatus according to claim 42, in which the processor is operable to measure the amount of detected light reflected from the heatable coating and use this to obtain information relating to the temperature of the heatable coating.

44. Apparatus according to claim 42, in which the processor is operable to measure the amount of detected light reflected from the heatable coating and use this to obtain information relating to the optical thickness of the heatable coating, where the optical thickness of the heatable coating depends on its temperature.

45. Apparatus according to claim 39, in which the heatable coating is provided as a single layer.

46. Apparatus according to claim 39, in which the heatable coating is provided as two layers, one layer being optically absorptive and one layer being optically dependent on temperature.

47. Apparatus according to any one of claims 24 and 35, wherein the optical fibre is deployed within a well bore.

48. A method of monitoring fluid flow in an oil well, comprising:
providing an optical fibre having a heatable coating provided as a layer around the outer surface of the optical fibre extending axially along the optical fibre;
deploying the optical fibre downhole in an oil well such that the heatable coating is in thermal contact with flowing fluid;
heating the heatable coating so that heat is transferred from the coating to the fluid;
launching light into the optical fibre;
detecting light from the optical fibre;

processing the detected light to obtain information indicative of the temperature of the heatable coating, where the temperature of the heatable coating depends on the flow; and using the information indicative of the temperature of the heatable coating to derive information about the flow, wherein the launching light, detecting light and processing the detected light are performed so as to obtain the information indicative of the temperature of the heatable coating in the form of a distributed temperature profile over the length of the optical fibre.

49. A method according to claim 48, in which the using the information indicative of the temperature of the heatable coating to derive information about the flow comprises identifying changes in temperature with depth within the well bore, such a change indicating the location of a change in the flow of the fluid.

50. A method according to claim 49, in which the identifying changes in temperature comprises locating any constriction in the flow that causes an increase in the flow of the fluid.

51. A method according to claim 50, in which the locating any constriction in the flow comprises locating any deposit of scale within the well bore.

52. A method according to any one of claims 48 and 49 to 51, and further comprising using the information indicative of the temperature of the heatable coating to derive information about the composition of the fluid.

53. A method according to claim 52, in which the information about the composition of the fluid includes at least one of the oil content, the gas content and the water content of the fluid.

54. A method of detecting scale within a well bore, comprising:

providing an optical fibre having a heatable coating;

deploying the optical fibre downhole within a well bore so that the heatable coating is in thermal contact with fluid flowing within the well bore;

heating the heatable coating so that heat is transferred from the coating to the fluid;

launching light into the optical fibre;

detecting light from the optical fibre;

processing the detected light to obtain information indicative of any variation in temperature of the heatable coating with depth within the well bore, where the temperature of the heatable coating depends on the flow of the fluid;

monitoring the temperature information for any changes in temperature of the heatable coating with depth within the well bore; and identifying any change in temperature with a change in fluid flow within the well bore caused by scale deposition at that depth.

* * * * *